(12) United States Patent
Li

(10) Patent No.: US 8,298,308 B2
(45) Date of Patent: Oct. 30, 2012

(54) AIR FILTER ASSEMBLY

(75) Inventor: Lei Li, Whitby, CA (US)

(73) Assignee: GM Global Technology Operations LLC, Detroit, MI (US)

(*) Notice: Subject to any disclaimer, the term of this patent is extended or adjusted under 35 U.S.C. 154(b) by 429 days.

(21) Appl. No.: 12/723,722

(22) Filed: Mar. 15, 2010

(65) Prior Publication Data
US 2011/0219735 A1    Sep. 15, 2011

(51) Int. Cl.
*B01D 46/00* (2006.01)

(52) U.S. Cl. ............. 55/385.3; 55/480; 55/493; 55/503; 123/198 E

(58) Field of Classification Search ................ 55/385.1, 55/385.3, 480, 490, 493, 503; 123/198 E
See application file for complete search history.

(56) References Cited

U.S. PATENT DOCUMENTS

| | | | | |
|---|---|---|---|---|
| 5,059,221 A | * | 10/1991 | McWilliam | 96/380 |
| 6,167,862 B1 | * | 1/2001 | Powell et al. | 123/198 E |
| 2006/0081528 A1 | * | 4/2006 | Oelpke et al. | 210/493.1 |
| 2008/0092500 A1 | | 4/2008 | Waltenberg et al. | |
| 2009/0242309 A1 | | 10/2009 | Kruger et al. | |

* cited by examiner

*Primary Examiner* — Duane Smith
*Assistant Examiner* — Karla Hawkins
(74) *Attorney, Agent, or Firm* — Quinn Law Group, PLLC

(57) ABSTRACT

A filter assembly includes a housing including a first member and a second member, and supporting therein a filter. The second member is at least partially disposed within an interior of said first member, with said first member vertically moveable relative to said second member in response to an impact load. At least one latch mechanism removeably couples the first member to the second member. The latch mechanism includes a damper that is biased against a vertical wall of the housing. The damper is compressible in a horizontal direction in response to the vertical movement of the first member relative to the second member.

20 Claims, 3 Drawing Sheets

AIR FILTER ASSEMBLY

TECHNICAL FIELD

The invention generally relates to an air filter assembly for a vehicle.

BACKGROUND OF THE INVENTION

Air filter assemblies filter out particulate matter from a flow of air entering an internal combustion engine. The air filter assembly is located within the engine compartment of a vehicle. Typically, the air filter assembly includes a rigid plastic housing, that includes a first member and a second member latched together. The housing defines an air inlet for receiving the flow of air, and an air outlet for exhausting the flow of air. A filter is disposed within an interior of the housing, between the air inlet and the air outlet, to filter out the particulate matter suspended within the flow of air.

A hood of the vehicle and the various components located within the engine compartment of the vehicle may be designed to deform in response to an impact load to absorb and/or dissipate energy. Enabling deformation of the hood may include providing a crush zone in the space immediately under the hood within the engine compartment that is free of any engine components, or alternatively only includes soft and/or compressible components. As the housing of the air filter assembly is generally rigid, the air filter assembly is generally precluded from being positioned within the crush zone immediately under the hood.

SUMMARY OF THE INVENTION

An air filter assembly for a vehicle is provided. The air filter assembly includes a housing having a first member and a second member. The first member is vertically moveable relative to the second member. The air filter assembly further includes at least one latch mechanism that is configured for removeably coupling the first member and the second member. The at least one latch mechanism includes a damper. The damper is biased against the housing, and is compressible in a horizontal direction in response to the vertical movement of the first member relative to the second member.

In another aspect of the invention, an air filter assembly for a vehicle is provided. The air filter assembly includes a housing having a first member and a second member. The first member is slideably disposed about an outer perimeter of the second member. The first member is vertically moveable relative to the second member. The second member is at least partially disposed within an interior of the first member. The air filter assembly further includes at least one latch mechanism. The latch mechanism is configured for removeably coupling the first member and the second member. The latch mechanism includes a damper that is biased against the housing. The damper is compressible in a horizontal direction in response to the vertical movement of the first member.

Accordingly, the air filter assembly is vertically compressible in response to an impact load, thereby allowing the air filter assembly to be located within a crush zone under a hood of a vehicle, while maintaining the appropriate deformation capabilities of the hood. The damper of the air filter assembly absorbs the impact energy as the first member moves vertically. Additionally, allowing the air filter assembly to compress vertically provides additional crushable space for the hood to deform upon impact, thereby allowing the hood to absorb more impact energy.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Referring to the Figures, wherein like numerals indicate corresponding parts throughout the several views, an air filter assembly is shown generally at 20. The air filter assembly 20 is for a vehicle, and is disposed within an engine compartment of the vehicle.

Figure 3:
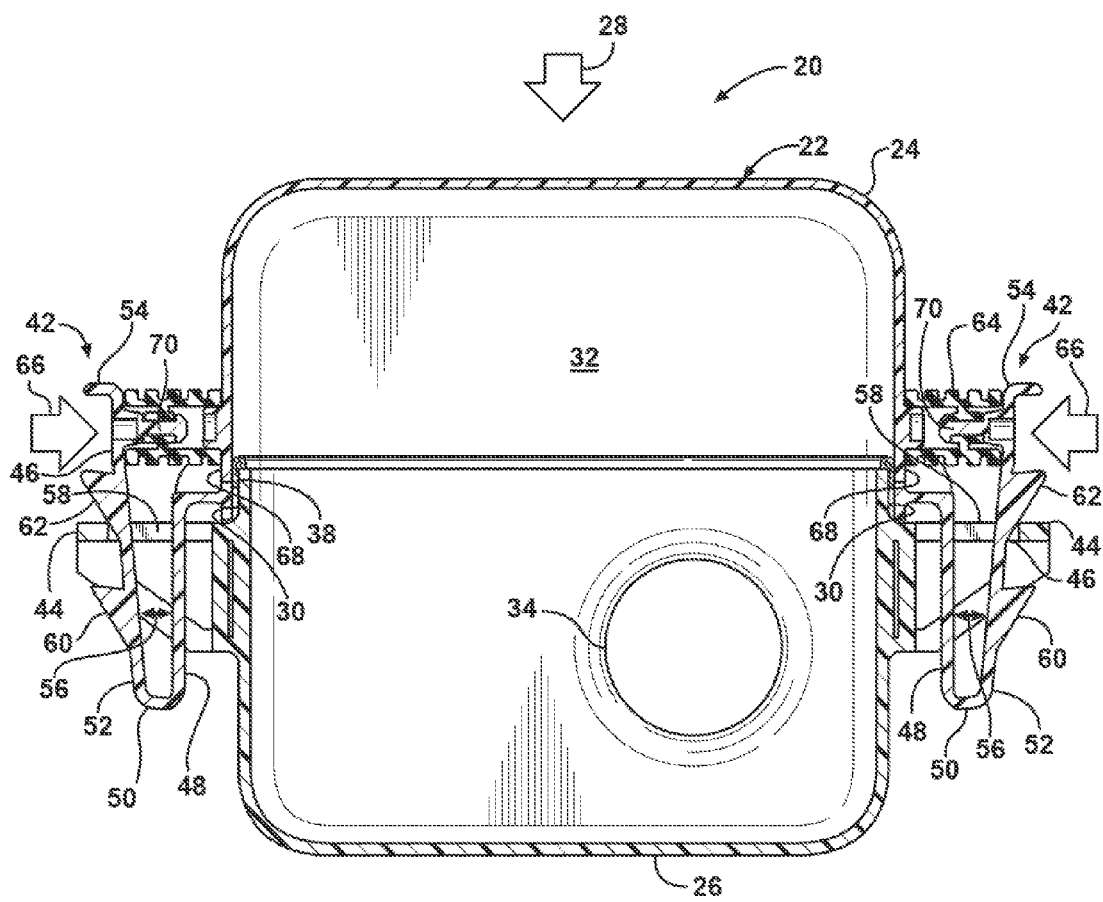
FIG. 3 is a schematic cross sectional view of the air filter assembly in a compressed, i.e., crash, position.

The air filter assembly 20 includes a housing 22. The housing 22 includes a first member 24, e.g., an upper member or a cover, and a second member 26, e.g., a lower member or a casing. It should be appreciated that the first member 24 and the second member 26 may be defined other than the upper member and the lower member respectively. As shown in FIG. 3, the first member 24 is vertically moveable relative to the second member 26 in response to a vertical load 28 being applied to the first member 24. For example, in the event an object strikes a hood of the vehicle causing the hood to collapse vertically downward, the hood may impart a vertical load 28 onto the first member 24 of the housing 22, thereby causing the first member 24 to move vertically relative to the second member 26. The first member 24 is slideably disposed about an outer perimeter 30 of the second member 26, thereby allowing for the vertical movement of the first member 24 relative to the second member 26. The second member 26 is at least partially disposed within an interior 32 of the first member 24. It should be appreciated that during the vertical movement of the first member 24 relative to the second member 26, the first member 24 slides down over the outer perimeter 30 of the second member 26, with the second member 26 respectively moving upward into the interior 32 of the first member 24.

The first member 24 and the second member 26 include and are manufactured from a rigid material. The rigid material may include, but is not limited to, a plastic, a polymer, nylon, metal, or some other rigid material capable of maintaining structural rigidity under a vacuum pressure.

The housing 22 includes and defines an air inlet 34 and an air outlet 36. The air inlet 34 receives a flow of air. The air outlet 36 exhausts the flow of air and directs the flow of air to an engine of the vehicle. At least one of the first member 24 and the second member 26 defines the air inlet 34 and the air outlet 36. As shown, the second member 26 defines the air inlet 34 and the first member 24 defines the air outlet 36. However, it should be appreciated that the second member 26 may define the air outlet 36 and the first member 24 define the air inlet 34, or that one of the first member 24 and the second member 26 could define both the air inlet 34 and the air outlet 36.

The air filter assembly 20 further includes a seal 38 disposed between the first member 24 and the second member 26. The seal 38 seals the first member 24 against the second member 26 to prevent air infiltration into or out of an interior 32 of the housing 22, from between the first member 24 and the second member 26. As shown, the seal 38 is attached to the second member 26 and includes a flange for engaging an interior surface of the first member 24. However, it should be appreciated that the seal 38 may include any suitable seal 38 capable of sealing the first member 24 relative to the second member 26, and may be attached to the housing 22 and configured other than shown and described herein.

The air filter assembly 20 further includes a filter 40. The filter 40 is disposed within the interior 32 of the housing 22. The filter 40 filters particulate matter from the flow of air as the flow of air passes between the air inlet 34 and the air outlet 36. As shown, the filter 40 includes a panel type filter 40 attached to and supported by the first member 24 of the housing 22. However, it should be appreciated that any suitable filter 40 may be utilized in the air filter assembly 20, such as a cylindrical filter 40 or the like. Accordingly, it should be appreciated that the filter 40 may be configured and attached to the housing 22 other than shown and described herein.

The air filter assembly 20 further includes at least one latch mechanism 42 that is configured for removeably coupling the first member 24 and the second member 26. As shown, the at least one latch mechanism 42 includes three latch mechanisms 42 spaced about the periphery of the housing 22. However, it should be appreciated that the air filter assembly 20 may include any number of latch mechanisms 42 suitable for the specific design and configuration of the housing 22, including but not limited to 1, 2, 3, 4, 5, etc.

Figure 1:
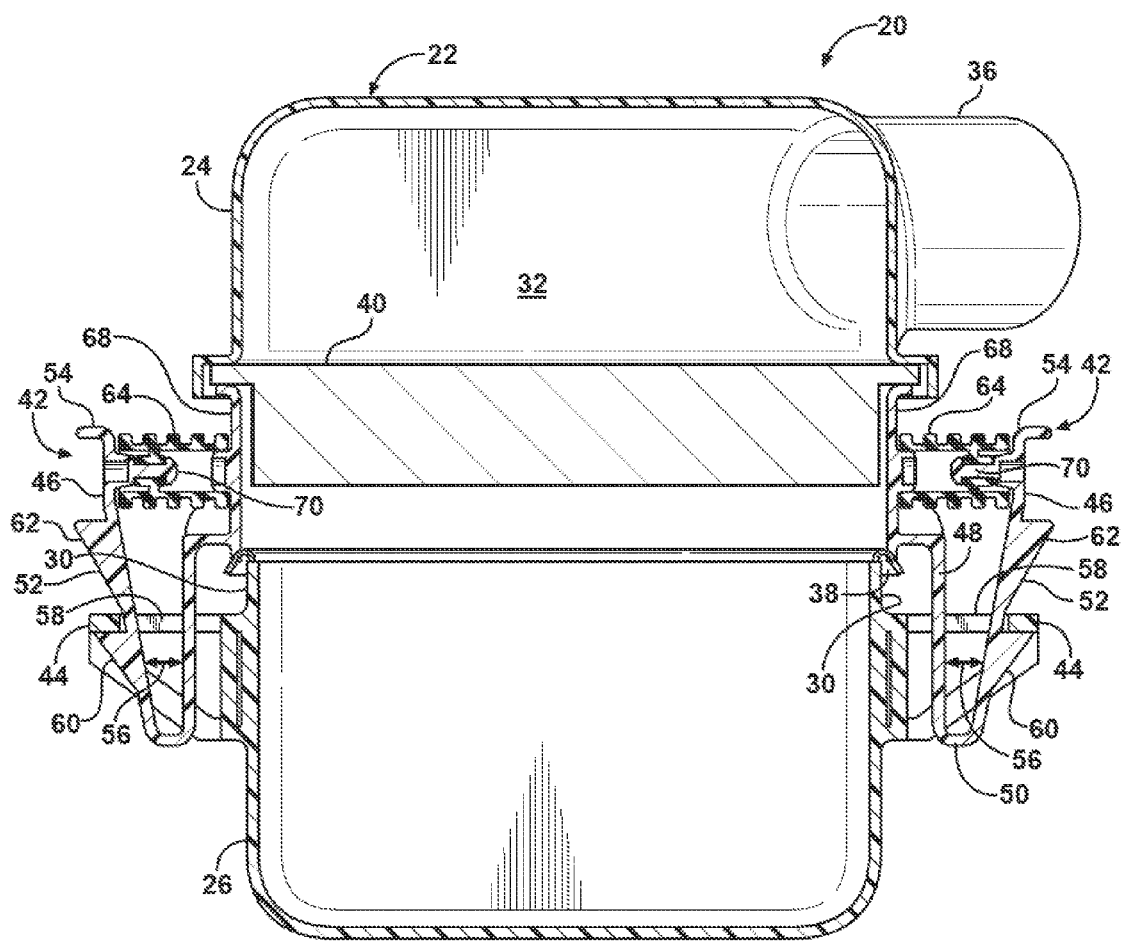
FIG. 1 is a schematic cross sectional view of an air filter assembly in an initial, i.e. normal operating, position.
Figure 2:
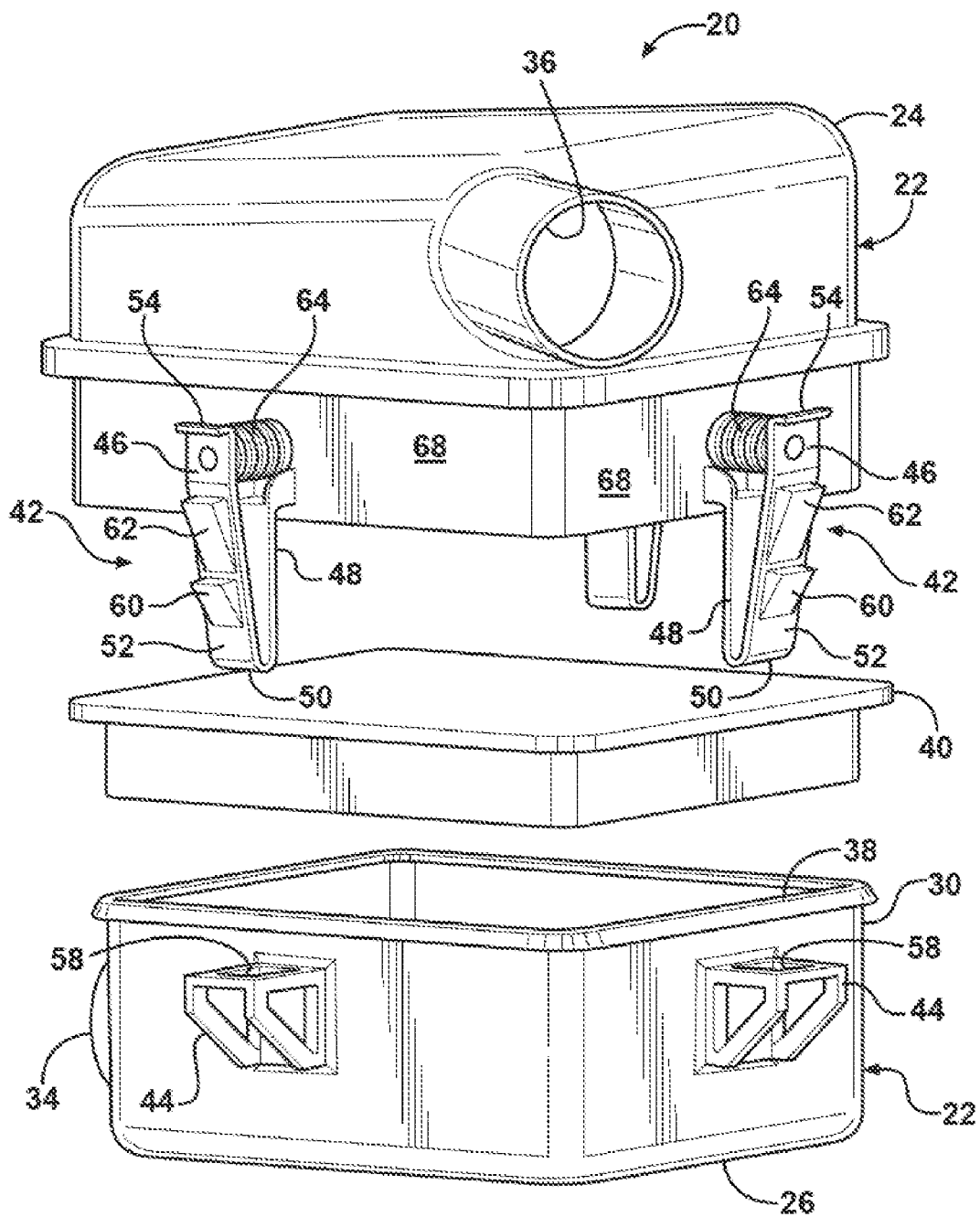
FIG. 2 is a schematic exploded perspective view of the air filter assembly.

The latch mechanism 42 includes a cage 44 disposed on one of the first member 24 and the second member 26, and a latch 46 disposed on another of the first member 24 and the second member 26. The latch 46 is in latching engagement with the cage 44 to prevent separation of the first member 24 from the second member 26, i.e., to secure the first member 24 to the second member 26 in an initial position, i.e., a normal operating position, which is shown in FIG. 1. As shown, the latch 46 is attached to the first member 24 and the cage 44 is attached to the second member 26. However, it should be appreciated that the relative positions of the latch 46 and the cage 44 may be reversed, with the latch 46 attached to the second portion 52 and the cage 44 attached to the first portion 48.

The latch 46 includes a first portion 48 attached to the housing 22, i.e., the first member 24, a spring portion 50 attached to the first portion 48, and a second portion 52 extending from the spring portion 50 to a distal end 54. The second portion 52 forms an acute angle 56 with the first portion 48. The spring portion 50 biases the second portion 52 away from the first portion 48 and the housing 22, and into latching engagement with the cage 44.

The cage 44 defines an enclosed opening 58, with the first portion 48 and the second portion 52 of the latch 46 moveably disposed within the enclosed opening 58. As such, the first portion 48 and the second portion 52 may move vertically within and/or through the enclosed opening 58. The second portion 52 includes a detent 60. The detent 60 engages the cage 44 when in the initial position, shown in FIG. 1. Accordingly, upon insertion of the latch 46 through the enclosed opening 58 a pre-determined distance, the detent 60 snaps into locking engagement with the cage 44 to secure the first member 24 relative to the second member 26, and prevent unintentional upward vertical movement of the first member 24 relative to the second member 26. The second portion 52 of the latch 46 further includes a wedge 62. The wedge 62 is disposed between the detent 60 and the distal end 54 of the second portion 52 of the latch 46. The wedge 62 engages the cage 44 during the vertical movement of the first member 24 relative to the second member 26, thereby wedging the second portion 52 of the latch 46 inward toward the housing 22 during the vertical movement of the first member 24 relative to the second member 26, as shown in FIG. 3.

The latch mechanism 42 further includes a damper 64. The damper 64 is biased against the housing 22, and is compressible in a horizontal direction, generally indicated by arrow 66, in response to the vertical movement, generally indicated by the vertical load 28, of the first member 24 relative to the second member 26. As described above, the latch 46 is attached to the first member 24 and the cage 44 is attached to the second member 26. The damper 64 is disposed adjacent the distal end 54 of the second portion 52, between the latch 46 and a vertical wall 68 of the housing 22, and is also disposed against an exterior surface of the housing 22. More specifically, the damper 64 is disposed between the second portion 52 of the latch 46 and a vertical wall 68 of the first member 24. The damper 64 is biased between and against the second portion 52 of the latch 46 and the vertical wall 68 of the first member 24.

The damper 64 includes a compressible material, i.e., a material capable of absorbing energy. The compressible material may include, but is not limited to, a rubber material, a polyurethane material or some other similar material. As shown, the damper 64 includes a tubular grommet, and the second portion 52 of the latch 46 includes a post 70, over which the tubular grommet is secured. However, it should be appreciated that the damper 64 may be configured in some other shape and secured to the latch mechanism 42 in a manner other than shown or described herein.

The acute angle 56 between the first portion 48 and the second portion 52 of the latch 46 decreases in magnitude during the vertical movement of the first member 24 relative to the second member 26, with the distal end 54 of the second portion 52 moving closer to the housing 22. As the distal end 54 of the second portion 52 moves closer to the housing 22, the damper 64, which is disposed between the second portion 52 of the latch 46 and the housing 22 is compressed, thereby resisting the movement of the distal end 54 of the second portion 52 and absorbing energy.

The latch mechanism 42 includes a tunable energy absorbing profile. The energy absorbing profile may be tuned to meet specific design and packaging restraints of the vehicle. The energy absorbing profile is dependent upon a horizontal displacement of the latch 46 during the vertical movement of the first member 24 relative to the second member 26, and a compressibility of the damper 64. Accordingly, the energy absorbing profile may be tuned by adjusting the distance of the horizontal displacement of the latch 46 during the vertical movement by adjusting the size and/or shape of the wedge 62, and by adjusting the compressibility characteristics of the damper 64. For example, a stiffer compressibility of the damper 64 may absorb more energy than a lower compressibility of the damper 64. Similarly, increasing a wedge 62 angle of the wedge 62 causes the second portion 52 of the latch 46 to move further horizontally toward the housing 22, which may increase the energy absorbed.

While the best modes for carrying out the invention have been described in detail, those familiar with the art to which this invention relates will recognize various alternative designs and embodiments for practicing the invention within the scope of the appended claims.

The invention claimed is:

1. An air filter assembly for a vehicle, the air filter assembly comprising:
   a housing having a first member and a second member, with said first member vertically moveable relative to said second member; and
   at least one latch mechanism configured for removeably coupling said first member and said second member,
   said at least one latch mechanism including a damper biased against said housing and compressible in a horizontal direction in response to said vertical movement of said first member relative to said second member.

2. An air filter assembly as set forth in claim 1 wherein said at least one latch mechanism includes a cage disposed on one of said first member and said second member, and a latch disposed on another of said first member and said second member in latching engagement with said cage to prevent separation of said first member from said second member.

3. An air filter assembly as set forth in claim 2 wherein said damper is disposed between said latch and a vertical wall of said housing.

4. An air filter assembly as set forth in claim 3 wherein said damper is disposed against an exterior surface of said housing.

5. An air filter assembly as set forth in claim 4 wherein said damper includes a tubular grommet.

6. An air filter assembly as set forth in claim 4 wherein said damper includes rubber.

7. An air filter assembly as set forth in claim 4 wherein said latch is attached to said first member and said cage is attached to said second member, with said damper biased against a vertical wall of said first member.

8. An air filter assembly as set forth in claim 7 wherein said first member is slideably disposed about an outer perimeter of said second member for said vertical movement of said first member relative to said second member, with said second member at least partially disposed within an interior of said first member.

9. An air filter assembly as set forth in claim 4 wherein said latch includes a first portion attached to said housing, a spring portion attached to said first portion, and a second portion extending from said spring portion to a distal end and forming an acute angle with said first portion.

10. An air filter assembly as set forth in claim 9 wherein said damper is disposed adjacent said distal end of said second portion.

11. An air filter assembly as set forth in claim 10 wherein said acute angle decreases in magnitude during said vertical movement of said first member relative to said second member to move said distal end of said second portion closer to said housing, with said damper resisting said movement of said distal end to absorb energy.

12. An air filter assembly as set forth in claim 11 wherein said second portion includes a detent for engaging said cage when in an initial position, and a wedge for engaging said cage during said vertical movement of said first member relative to said second member.

13. An air filter assembly as set forth in claim 12 wherein said cage defines an enclosed opening with said first portion and said second portion of said latch moveably disposed within said enclosed opening.

14. An air filter assembly as set forth in claim 13 wherein said spring portion biases said second portion away from said first portion and into latching engagement with said cage.

15. An air filter assembly as set forth in claim 2 wherein said at least one latch mechanism includes an energy absorbing profile dependent upon a horizontal displacement of said latch during said vertical movement of said first member relative to said second member, and a compressibility of said damper.

16. An air filter assembly for a vehicle, the air filter assembly comprising:
   a housing having a first member and a second member, said first member slideably disposed about an outer perimeter of said second member and vertically moveable relative to said second member, with said second member at least partially disposed within an interior of said first member;
   a filter disposed within an interior of said housing; and
   at least one latch mechanism configured for removeably coupling said first member and said second member,
   said at least one latch mechanism including a damper biased against said housing and compressible in a horizontal direction in response to said vertical movement of said first member relative to said second member.

17. An air filter assembly as set forth in claim 16 wherein said at least one latch mechanism includes a cage disposed on said second member, and a latch disposed on said first member in latching engagement with said cage to prevent separation of said first member from said second member, with said damper disposed between said latch and a vertical wall of said housing and configured for resisting horizontal movement of said latch toward said housing.

18. An air filter assembly as set forth in claim 17 wherein said latch includes a first portion attached to said first member, a spring portion attached to said first portion, and a second portion extending from said spring portion to a distal end and forming an acute angle with said first portion, wherein said damper is disposed adjacent said distal end of said second portion.

19. An air filter assembly as set forth in claim 18 wherein said acute angle decreases in magnitude during said vertical movement of said first member relative to said second member to move said distal end of said second portion closer to said housing, with said damper resisting said movement of said distal end to absorb energy.

20. An air filter assembly as set forth in claim 17 wherein said at least one latch mechanism includes an energy absorbing profile dependent upon a horizontal displacement of said latch during said vertical movement of said first member relative to said second member, and a compressibility of said damper.

* * * * *